(12) United States Patent
Hamilton

(10) Patent No.: US 9,630,303 B2
(45) Date of Patent: Apr. 25, 2017

(54) BICYCLE ALIGNMENT TOOL

(71) Applicant: Jeffrey Hamilton, Agawam, MA (US)

(72) Inventor: Jeffrey Hamilton, Agawam, MA (US)

(*) Notice: Subject to any disclaimer, the term of this patent is extended or adjusted under 35 U.S.C. 154(b) by 98 days.

(21) Appl. No.: 14/671,797

(22) Filed: Mar. 27, 2015

(65) Prior Publication Data
US 2015/0323315 A1 Nov. 12, 2015

Related U.S. Application Data

(60) Provisional application No. 61/989,916, filed on May 7, 2014.

(51) Int. Cl.
G01B 11/27 (2006.01)
B25B 27/00 (2006.01)

(52) U.S. Cl.
CPC .......... *B25B 27/0071* (2013.01); *G01B 11/27* (2013.01)

(58) Field of Classification Search
CPC .................. B25B 27/0071; G01B 11/27
USPC ........................................... 33/286
See application file for complete search history.

(56) References Cited

U.S. PATENT DOCUMENTS

| | | | | |
|---|---|---|---|---|
| 5,303,439 A * | 4/1994 | Seals | ................ | B25B 13/56 59/7 |
| 2003/0182814 A1* | 10/2003 | Duke | ................ | G01B 5/255 33/203 |
| 2004/0257569 A1* | 12/2004 | Anderson | ................ | G01B 11/27 356/399 |
| 2009/0126211 A1* | 5/2009 | Mandaric | ................ | G01B 5/0025 33/503 |
| 2012/0246958 A1* | 10/2012 | Buckland | ................ | G01B 5/14 33/701 |
| 2012/0285026 A1* | 11/2012 | Min | ................ | A61G 5/10 33/264 |
| 2014/0338207 A1* | 11/2014 | Fernandez Sanchez | . | G01B 3/08 33/613 |
| 2014/0375993 A1* | 12/2014 | Kettle | ................ | G01B 11/2755 356/400 |
| 2015/0068053 A1* | 3/2015 | Sowley, Jr. | ................ | G01C 9/28 33/379 |

* cited by examiner

*Primary Examiner* — G. Bradley Bennett
(74) *Attorney, Agent, or Firm* — Lyman Smith

(57) ABSTRACT

A bicycle alignment device can be used to align the nose of the bicycle seat with the top tube of the bicycle frame. In addition, the same device can be used to align the handlebar stem with the front tire of the bicycle. The device can use a pointing device, such as a pin or a laser pointer, to align the seat to the top tube. The device can be easily broken down into its components for easy and convenient storage when not in use.

15 Claims, 3 Drawing Sheets

BICYCLE ALIGNMENT TOOL

CROSS-REFERENCE TO RELATED APPLICATION

This application claims the benefit of priority of U.S. provisional application No. 61/989,916, filed May 7, 2014, the contents of which are herein incorporated by reference.

BACKGROUND OF THE INVENTION

The present invention relates to hand tools and, more particularly, to a bicycle seat and handlebar stem alignment device that can be used to align the nose of the bicycle seat with the top tube of the bicycle frame and also align the handlebar stem with the front tire of the bicycle.

Alignment of the components of a bicycle can be important for the rider. If the handlebars or seat are offset, even by a small angle, the overall ride for the cyclist can significantly change. When riders take their bicycles apart for traveling, for example, re-alignment of the seat and handlebars is needed at the cyclists' destination.

Many cyclists align their handlebars and seats by eye, attempting to align the handlebars with the front tire and the seat with the top tube of the bicycle frame. However, even the best eyes may not consistently provide accurate alignment.

Recently, there has been introduced a tool for aligning components along a handlebar, including the front tire. This tool, however, does not provide a convenient adjustment for the seat to the frame. Additional components or devices may be needed to provide seat alignment as well as handlebar alignment.

As can be seen, there is a need for a device that can easily and accurately align the handlebars and seat of a bicycle.

SUMMARY OF THE INVENTION

In one aspect of the present invention, a bicycle alignment tool comprises a swivel bracket; a mounting bracket pivotably connected at a first end thereof to the swivel bracket; a first interlock disposed at a second, opposite end of the mounting bracket; a mounting bracket having a second interlock mating with the first interlock; and a mounting interface connecting the mounting bracket to a structure of a bicycle.

In another aspect of the present invention, a bicycle alignment tool for aligning a seat and a handlebar of a bicycle, comprises a swivel bracket; a mounting bracket pivotably connected at a first end thereof to the swivel bracket; a first interlock disposed at a second, opposite end of the mounting bracket; a mounting bracket having a second interlock mating with the first interlock; a mounting interface connecting the mounting bracket to a structure of the bicycle; and a laser pointer mounted in the swivel bracket, wherein the first interlock mates with the second interlock at four positions spaced apart at 90 degree intervals.

These and other features, aspects and advantages of the present invention will become better understood with reference to the following drawings, description and claims.

DETAILED DESCRIPTION OF THE INVENTION

Figure 1:
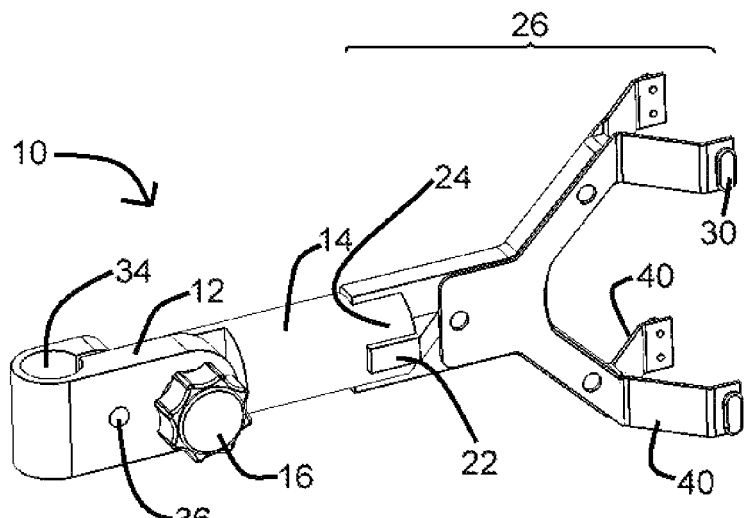
FIG. 1 is a top perspective view of a bicycle alignment device according to an exemplary embodiment of the present invention.
Figure 2:
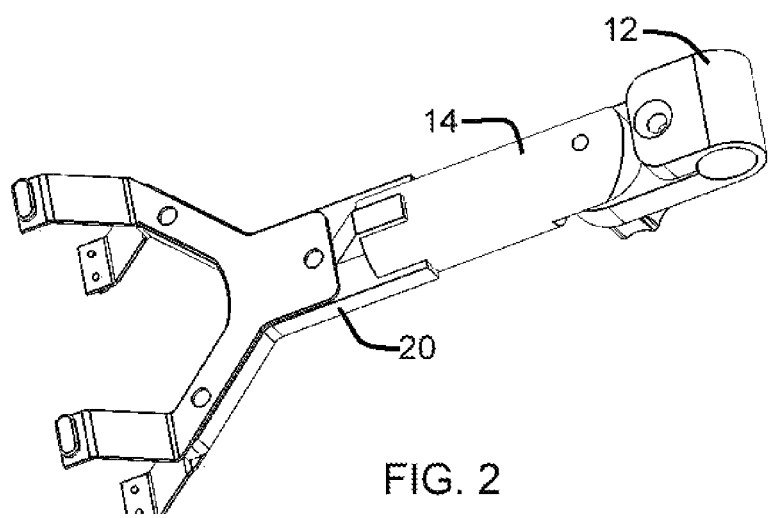
FIG. 2 is a bottom perspective view of the bicycle alignment device of FIG. 1.
Figure 3:
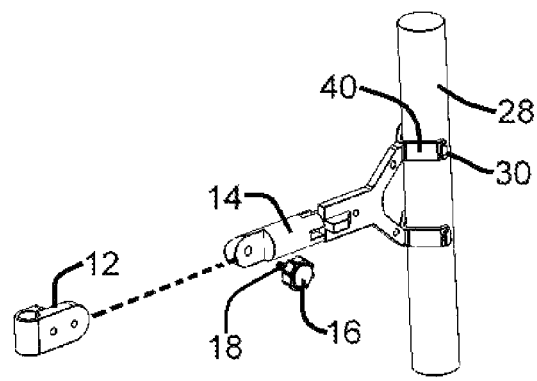
FIG. 3 is an exploded perspective view of the bicycle alignment device of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a bicycle alignment device that can be used to align the nose of the bicycle seat with the top tube of the bicycle frame. In addition, the same device can be used to align the handlebar stem with the front tire of the bicycle. The device can use a pointing device, such as a pin or a laser pointer, to align the seat to the top tube. The device can be easily broken down into its components for easy and convenient storage when not in use.

Referring now to FIGS. 1 through 4, an alignment device 10 (also referred to simply as device 10) can include a laser swivel bracket 12 that can be pivotably attached to a laser post mount 14. Various connection mechanisms can be used to pivotably connect the swivel bracket 12 to the post mount 14. For example, as shown in the Figures, a knob 16 can be used to make this connection, where tightening the knob can create a friction fit between the swivel bracket 12 and the post mount 14. Other connections, such as a twist lock, a gear and sprocket, or the like, can be used provided that the swivel bracket 12 can connect to the post mount 14 and be pivoted about an axis (such as the axis of a screw post 18 of the knob 16).

A mounting bracket 20 can terminate in an interlock, such as a male interlock 22. A distal end of the post mount 14 (distal relative to the attachment of the post mount 14 to the swivel bracket 12) can include an interlock, such as a female interlock 24, that mates with the male interlock 22 of the mounting bracket. The interlocks 22, 24 can fix the rotational position of the mounting bracket 20 relative to the post mount 14. The interlocks 22, 24 permit placement of the mounting bracket 20 into the post mount 14 at four positions, each positioned 90 degrees from the other. The interlocks 22, 24 can be designed in various manners, provided that the interlocks 22, 24 may be turned at 90 degree intervals relative to one another. For example, the interlocks 22, 24 may be a ratchet design, or may be connected via an elastic member that holds the members together but allows sufficient disconnection to permit adjustment thereof.

A mounting interface 26 can extend from the mounting bracket 20. The mounting interface 26 can include a mechanism for attaching the mounting bracket 20 to a structure 28 of the bicycle (not shown). This structure 28, as described in greater detail below, can be a bicycle seat post or a handlebar assembly. Various mechanisms can be provided to secure the mounting interface 26 to the structure 28. For example, a mounting strap anchor 30 can be provided for attaching a mounting strap (not shown) for tightening about the structure 28. Other connection mechanisms, such as twist lock, ratchet lock, and the like, can be used, provided that the mounting interface 26 can be secured to and removed from the structure 28. The mounting interface 26 can attach to the mounting bracket 20 or may be formed integrally therewith. As shown in the Figures, the mounting interface 26 can include two sets of arms 40 that are spaced apart a width of the structure 28 so that the mounting interface 26 is secured at two points along the structure 28. Each of the opposing arms 40 can extend from the mounting interface 26 at an angle of 45 degrees to aid in centering the mounting interface 26 on the structure 28.

A laser pointer 32 may be disposed in a laser mounting hole 34 of the swivel bracket 12. The laser pointer 32 may be secured in the laser mounting hole 34 by various mechanisms, such as with an attachment screw 36. The laser pointer 32 may shine a laser light out of a top end thereof, generally perpendicular to a longitudinal axis of the swivel mount 12. In some embodiments, the laser pointer 32 can direct a laser light out of a top end and a bottom end thereof, at 180 degrees of each other. This embodiment may be useful for seat alignment as discussed below. The laser pointer 32 may include an on/off switch, a replaceable battery compartment and other features as may be known in the art. The laser pointer 32 may create various patterns, such as a point, a solid line, a hatched line, a cross-hatch, a plurality of cross-hatches, or the like.

Figure 4:
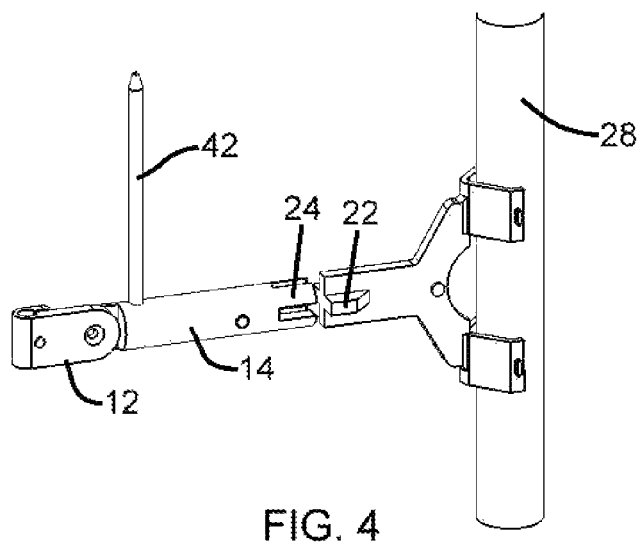
FIG. 4 is a perspective view of a pin-type bicycle alignment device according to an alternate embodiment of the present invention.
Figure 5:
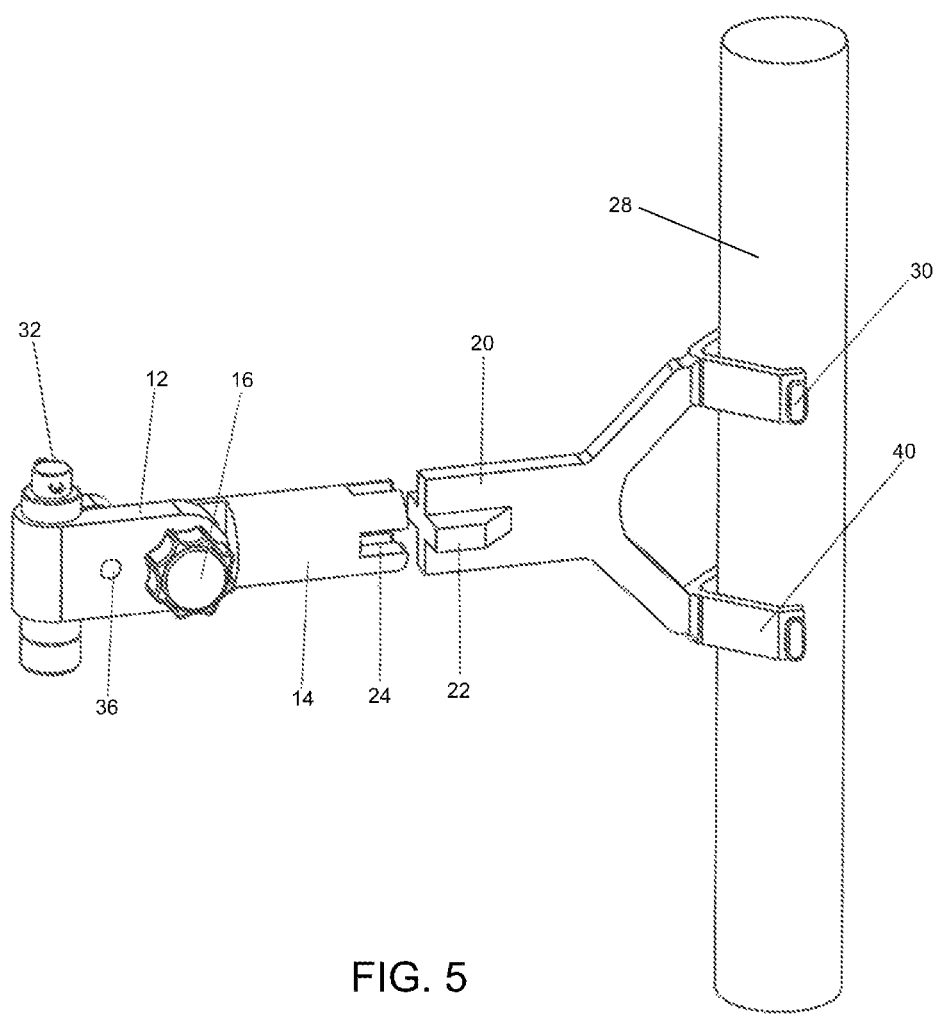
FIG. 5 is a perspective view of the bicycle alignment device of FIG. 1 having a laser pointer installed therein and attached to a bicycle structure, according to an exemplary embodiment of the present invention.

As shown in FIG. 4, in an alternate embodiment, a pin 42 may be disposed in one of the swivel bracket 12 or the post mount 14 (as shown in the Figure). The pin 42 may be used in place of the laser pointer to provide alignment. The pin 42 can, for example, be removably placed in a hole disposed in the device 10.

The device 10 may be made from various materials, such as plastic manufactured by using either a molding or machining process. Of course, other materials may be used, such as metal, composite, wood, or combinations thereof.

For seat alignment, the device 10 of the present invention can work by aligning the center point of the nose of the bicycle seat with the centerline of the top tube on the bicycle frame. To accomplish this, a user can first insert the laser pointer 32 into the laser swivel bracket 12 and secure it using the attachment screw 36. Next, the user could attach the device 10 to the structure 28 (the seat post) using the mounting straps so that the 45 degree post interface 26 is in a vertical orientation to the seat post of the bicycle facing forward toward the handlebars with the device 10 parallel to the top tube. The mounting straps should be loose enough so that the device can be pivoted either left or right. Next the user would connect the female interlock 24 of the laser post mount 14 with the male interlock 22 of the main mounting bracket 20 so the laser pointer 32 would be pointing in an upward direction at zero degrees. The next step would be to turn on the laser pointer 32 and orient the laser beam to the center point of the nose of the bicycle seat. This is accomplished by using the adjustment knob 16 on the device 10 for angularity while moving the device laterally either left or right. Once the center point on the seat has been identified the mounting straps can be tightened and the laser pointer 32 can be turned off.

The next phase of the alignment would be to disconnect the male 22 and female 24 interlock. The user would then reconnect the interlock with the laser pointer 32 now pointing downward at one hundred and eighty degrees. At this time, the user can loosen the bicycle seat post clamp assembly and again turn on the laser pointer 32. Using the laser beam as a guide, the user can then adjust the nose of the bicycle seat with the approximate centerline of the top tube on the bicycle frame. This is accomplished by pivoting the bicycle seat either left or right until the user reaches the optimal alignment using the laser beam as the guide. The user would then turn off the laser pointer 32 and re-tighten the seat post clamp assembly to the bicycle manufacturer's specifications.

Alternatively, the device 10 of the present invention can also be used to align the handlebar stem of the bicycle with the front tire. This assumes that the handlebars are already mounted in the handlebar stem clamp assembly. The user first inserts the laser pointer 32 into the laser swivel bracket 12 and secures it using the attachment screw 36. Instead of attaching the device to the seat post, the user would instead attach the device to the handlebars of the bicycle using the mounting straps. In this application, the 45 degree post interface 26 would be placed in a horizontal orientation to the handlebars positioned equidistant to the outside edges of the handlebar stem clamp assembly.

The device could then be secured to the handlebars using the mounting straps. Next, the user would attach the female interlock 24 with the male interlock 22 so the laser pointer 32 would be pointing in a downward trajectory one hundred and eighty degrees towards the front tire. The next step would be to loosen the handlebar stem and turn on the laser pointer 32. Angularity of the laser beam for positioning on the tire can be accomplished by using the adjustment knob 16 on the device. By moving the handlebars laterally left or right, the user can then align the handlebar stem by pointing the laser beam to the approximate centerline of the tire. Once centered, the user would turn off the laser pointer 32 and re-tighten the handlebar stem following the manufacturer's specifications.

It should be understood, of course, that the foregoing relates to exemplary embodiments of the invention and that modifications may be made without departing from the spirit and scope of the invention as set forth in the following claims.

What is claimed is:

1. A bicycle alignment tool comprising:
a swivel bracket;
a mounting bracket pivotably connected at a first end thereof to the swivel bracket;
a first interlock disposed at a second, opposite end of the mounting bracket;
a mounting bracket having a second interlock mating with the first interlock; and
a mounting interface connecting the mounting bracket to a structure of a bicycle.

2. The bicycle alignment tool of claim 1, wherein the first interlock mates with the second interlock at four positions spaced apart at 90 degree intervals.

3. The bicycle alignment tool of claim 1, further comprising a laser pointer mounted in the swivel bracket.

4. The bicycle alignment tool of claim 3, wherein the laser pointer is a double-output laser pointer.

5. The bicycle alignment tool of claim 1, further comprising a knob for loosening and tightening a pivot attachment between the swivel bracket and the mounting bracket.

6. The bicycle alignment tool of claim 5, wherein the swivel bracket swivels about a post extending from the knob.

7. The bicycle alignment tool of claim 1, wherein the first interlock is a female interlock and the second interlock is a male interlock.

8. The bicycle alignment tool of claim 1, wherein the structure is either a handlebar of the bicycle or the seat post of the bicycle.

9. A bicycle alignment tool for aligning a seat and a handlebar of a bicycle, comprising:
- a swivel bracket;
- a mounting bracket pivotably connected at a first end thereof to the swivel bracket;
- a first interlock disposed at a second, opposite end of the mounting bracket;
- a mounting bracket having a second interlock mating with the first interlock;
- a mounting interface connecting the mounting bracket to a structure of the bicycle; and
- a laser pointer mounted in the swivel bracket, wherein the first interlock mates with the second interlock at four positions spaced apart at 90 degree intervals.

10. The bicycle alignment tool of claim 9, wherein the laser pointer outputs a laser beam at opposite ends thereof.

11. The bicycle alignment tool of claim 9, further comprising a knob for loosening and tightening a pivot attachment between the swivel bracket and the mounting bracket.

12. The bicycle alignment tool of claim 11, wherein the swivel bracket swivels about a post extending from the knob.

13. The bicycle alignment tool of claim 9, wherein the first interlock is a female interlock and the second interlock is a male interlock.

14. The bicycle alignment tool of claim 9, wherein the structure is either a handlebar of the bicycle or the seat post of the bicycle.

15. A method for aligning a seat and a handlebar of a bicycle, comprising:
- attaching an alignment tool to a seat post of the bicycle, the alignment tool including a swivel bracket, a mounting bracket pivotably connected at a first end thereof to the swivel bracket, a first interlock disposed at a second, opposite end of the mounting bracket, a mounting bracket having a second interlock mating with the first interlock, a mounting interface connecting the mounting bracket to the seat post of the bicycle, and a laser pointer disposed into the swivel bracket;
- aiming the laser pointer at a centerline nose of the seat;
- tightening the mounting interface to the seat post;
- adjusting the seat post so that the laser pointer is aimed at a centerline of a top tube of the bicycle;
- tightening the seat post;
- tightening the mounting interface onto the handle bar;
- removing the first interlock from the second interlock, turning 90 degrees so that the laser pointer points toward a front tire of the bicycle and reconnecting the first interlock to the second interlock;
- adjusting the handle bars to align the laser pointer with a centerline of the front tire; and
- tightening the handle bars.

* * * * *